(No Model.)

H. B. GAUS, Jr.
BOX MATCHER MACHINE.

No. 288,567. Patented Nov. 13, 1883.

Attest:
Albert G. Fish
S. E. Logan

Inventor:
Henry B. Gaus Jr.
by C. D. Moody
atty

UNITED STATES PATENT OFFICE.

HENRY B. GAUS, JR., OF ST. LOUIS, MISSOURI.

BOX-MATCHER MACHINE.

SPECIFICATION forming part of Letters Patent No. 288,567, dated November 13, 1883.

Application filed August 2, 1883. (No model.)

*To all whom it may concern:*

Be it known that I, HENRY B. GAUS, Jr., of St. Louis, Missouri, have made a new and useful Improvement in Box-Matcher Machines, of which the following is a full, clear, and exact description, reference being had to the annexed drawings, making part of this specification, in which—

Figure 1:
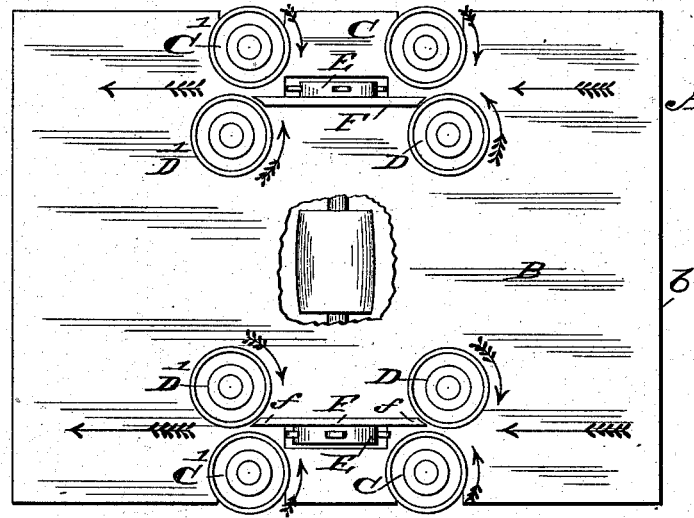
Figure 2:
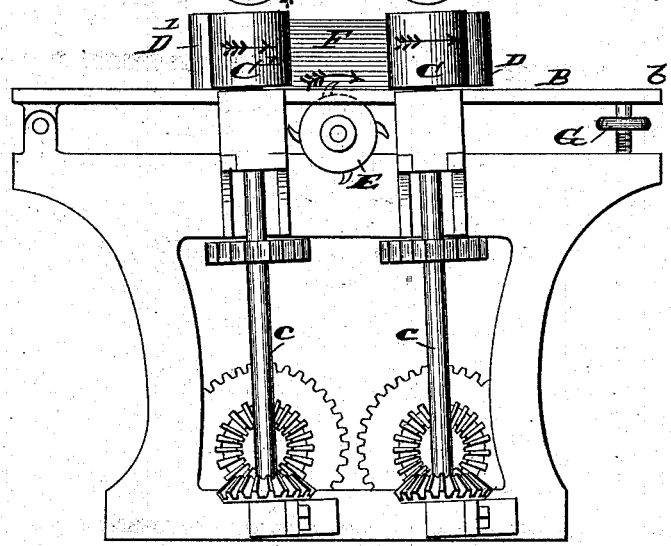
Figure 3:
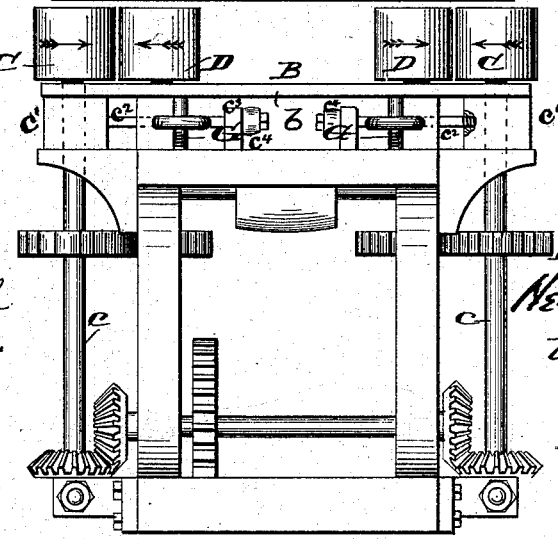

Figure 1 is a plan, Fig. 2 a side elevation, and Fig. 3 the front end elevation, of the improved machine.

The same letters of reference denote the same parts.

This improvement relates to the means for guiding the boards through the machine, to the means for holding the boards down to the cutter, and to the adjustable table, in combination with the means for holding the boards down to the cutter.

A represents a box-matcher machine of the customary form, saving as modified by this improvement.

B represents the table.

C C' D D' represent the feed-rolls.

The machine is preferably a double one, having two cutters, E E, and two sets of feed-rolls. These rolls, in place of being vertical, are, as well as their shafts $c\ c$, slightly inclined, as shown in Fig. 2. This causes the board, in being fed through the rolls, to be drawn downward to the cutter E, and thereby shaped more accurately, and also fed more readily through the machine.

The rolls C C' are not exactly opposite the rolls D D', respectively, and on the side of the cutter next to the rolls D D' a guide, F, is arranged. The guide is in line with the rolls D D', and its ends $f\ f$ lap the rolls C C', respectively, substantially as shown in Fig. 1. When the rolls are directly opposite each other, so that the guide does not at its ends come opposite the rolls C C', the board, in passing the cutter, is liable to vibrate, and in consequence to be unevenly cut; but when the rolls C C' D D' and the guide F are relatively arranged as described, the board is held firmly and the shaping by the cutter is accurately performed.

As cutters having teeth of different lengths are to be used in the machine, the table B, at its forward end, $b$, is made, by means of the screws G G, vertically adjustable, so that when a cutter having shorter teeth is used the end $b$ of the table can be lowered, and when a cutter having longer teeth is used the end $b$ is raised. Even when the end $b$ is elevated, the shafts and feed-rolls are inclined thereto, and the boards, in all positions of the table, are held down to the cutter.

The rolls C C' are held elastically toward the rolls D D', so that boards of different widths can be run through the machine. To this end the box $c'$ of the shaft $c$ is held by a bolt, $c^2$, which passes through a fixed bar, $c^3$, and is provided with a rubber washer, $c^4$, and the shaft $c$, at its lower end, is stepped so that the shaft may be inclined laterally.

I claim—

1. The combination of the inclined feed-rolls C C' and D D', placed on the table diagonally to each other, as described, and their inclined shafts $c\ c$, with the bolts $c^2\ c^2$, the boxes $c'\ c'$, the bar $c^3$, and the rubber washer $c^4$, whereby the rolls C C' are held elastically toward the rolls D D', substantially as described.

2. A box-matcher machine, A, having the feed-rolls C C' D D' placed diagonally to each other, as described, and inclined on the shafts $c\ c$, as and for the purpose described.

3. The combination, in a box-matcher machine, of the rolls C C' and D D', placed on the table diagonally to each other, as described, and inclined on their shafts $c\ c$, the cutter E, and the guide F, which is in line with the rolls D D' and laps the rolls C C', all as described.

HENRY B. GAUS, JR.

Witnesses:
C. D. MOODY,
J. W. HOKE.